Figure 1:
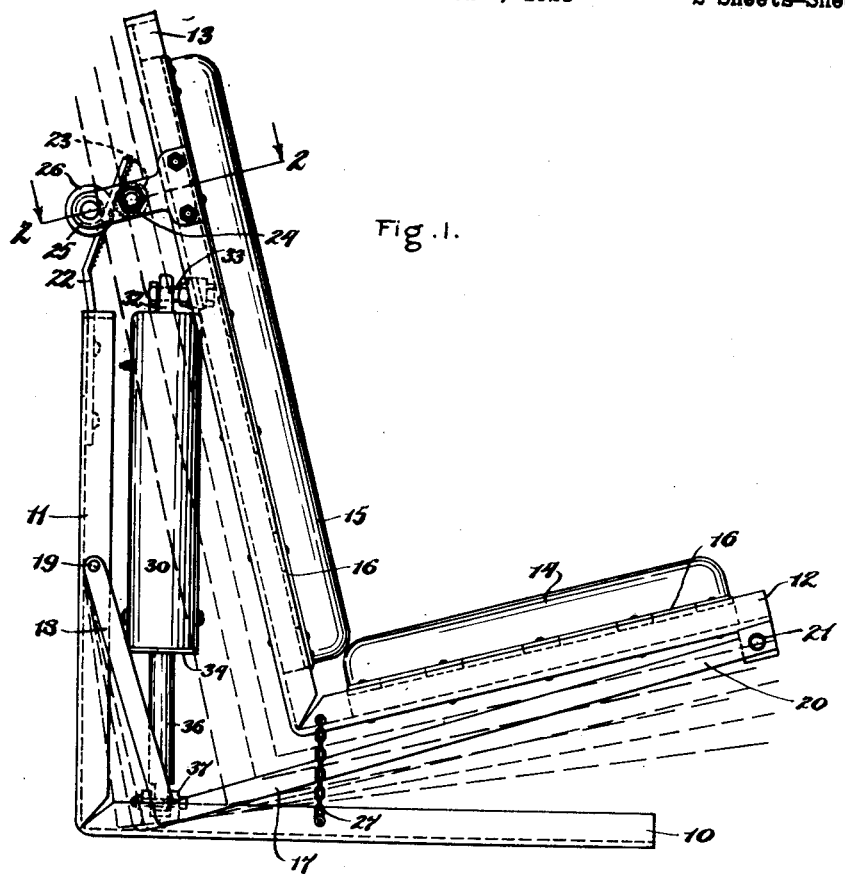

Oct. 3, 1933.  A. F. HICKMAN  1,929,023
SEAT
Filed March 8, 1928  2 Sheets-Sheet 1

Inventor
Albert F. Hickman
By Popper Powers
Attorneys

Oct. 3, 1933. A. F. HICKMAN 1,929,023
SEAT
Filed March 8, 1928 2 Sheets-Sheet 2
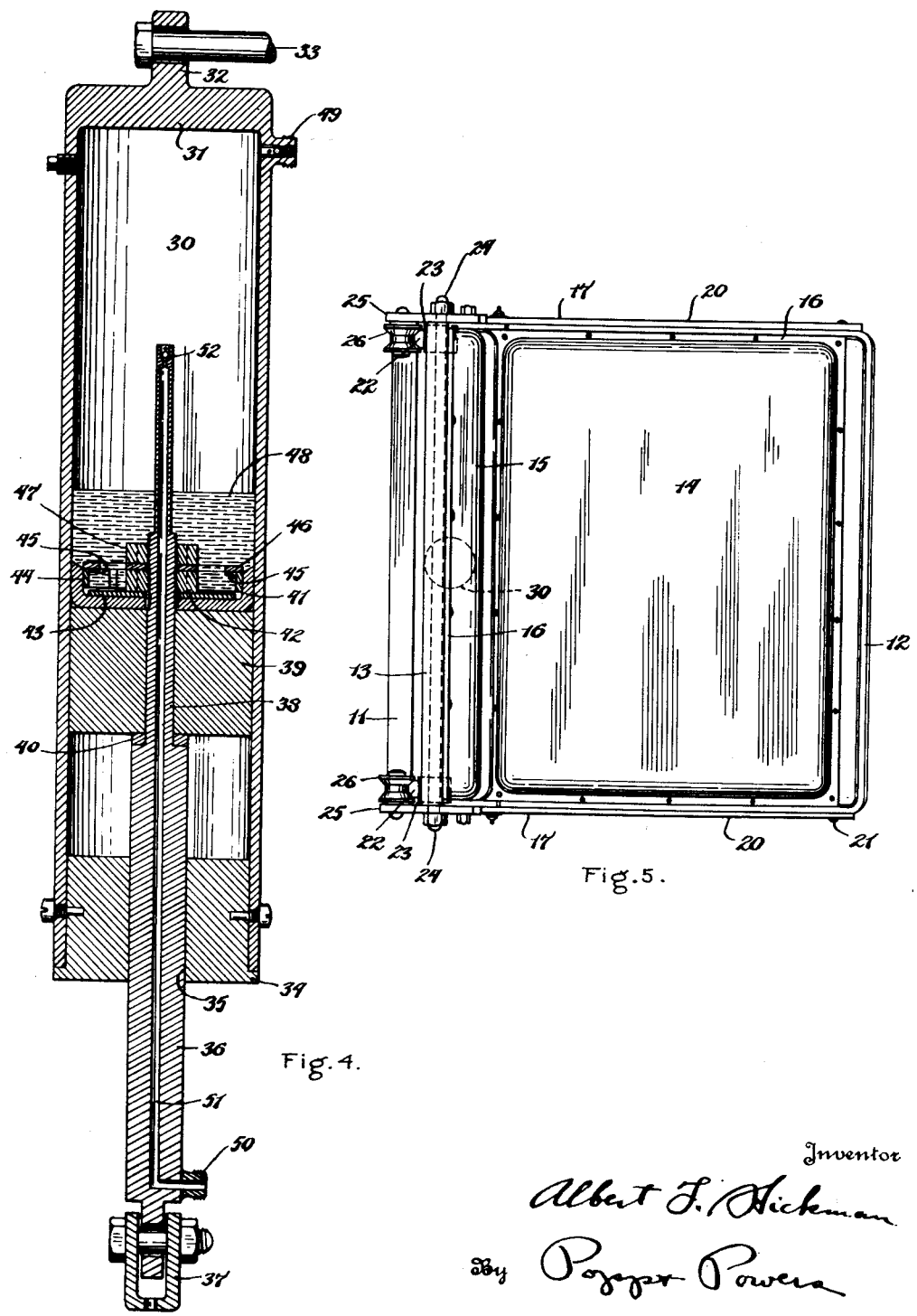

Patented Oct. 3, 1933

1,929,023

UNITED STATES PATENT OFFICE 1,929,023

SEAT

Albert F. Hickman, Eden, N. Y., assignor to Hickman Pneumatic Seat Company, Inc., Eden, N. Y., a corporation of New York Application March 8, 1928. Serial No. 260,062

8 Claims. (Cl. 155—53)

This invention relates to an automobile seat and more particularly to a seat which is supported and cushioned by air so that the jars, shocks and vibrations caused by the automobile or truck passing over uneven roads are not transmitted to the driver or passengers of the vehicle. The seat forming the subject of this invention is, however, also available for use in railway cars, street cars, pleasure cars, seats provided on machinery or anywhere else where a cushioned seat is desirable.

Even with the provision of automobile shock absorbers, it has been found that larger vehicles, such as automobile trucks and omnibuses are extremely uncomfortable to the driver or passengers of the same, particularly when a light load is being carried, since the vibration and jars of the vehicle in passing over a rough or uneven road are not completely absorbed by the spring structure of the automobile but are transmitted directly to the seat of the same and hence render its driving or riding uncomfortable. Serious illnesses and permanent injury to truck drivers, particularly kidney trouble and other afflictions, have been directly traced to the constant vibration to which the body of the truck driver is subjected in operating the same. To this end the present invention proposes a floating seat frame which is directly supported by air pressure so that all slight jars, shocks and vibrations are absorbed and the effect of greater jars will be greatly diminished and the riding of the truck thereby rendered comfortable and healthful.

One of the objects of this invention is to provide such a seat structure which is compact and strong and will adequately withstand the strains to which it is subjected.

A further object is to provide such a structure which will adequately absorb the shocks, jars and vibrations regardless of the weight of the driver using the same.

Another object is to provide such a structure which will retain a charge of air pressure and lubricating oil for a considerable period of time, thereby requiring infrequent attention in keeping the same in good running condition.

Another aim is to provide such a shock absorber in which the proper air pressure can be maintained from an exterior pressure tank so that when a plurality of such shock absorbers are employed, for example, in connection with the passenger seats of busses or the like, a single air pressure tank can be employed to maintain the proper pressure in the various absorbers.

A still further aim is to provide guiding means for the seat frame which permit it to move downwardly and slightly rearwardly when a severe jar is imparted to it by the automobile body, thereby securing the most comfortable and natural movement of the seat for the driver.

Another purpose is to provide a seat of this character which, by proper proportioning of the air cylinder, will take the slightest vibration and will convert violent rebound actions of the vehicle into an undulating movement of the seat and entirely eliminating the danger of the occupant being thrown.

Other objects are to provide such a seat which is simple and inexpensive in construction and can either be applied to cars now in use without alteration in the same or can be built into cars in the course of their manufacture.

Figure 2:
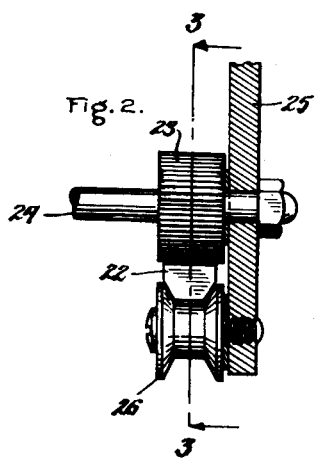
Figure 3:
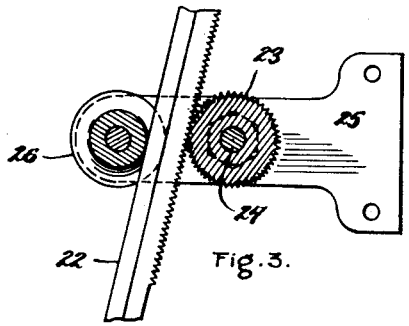

In the accompanying drawings:

Figure 1 is a side elevation of a truck seat made in accordance with my invention. Figure 2 is a fragmentary sectional view taken on line 2—2, Fig. 1. Figure 3 is a fragmentary vertical section taken on line 3—3, Fig. 2. Figure 4 is a vertical section through the air absorber cylinder. Figure 5 is a top plan view of the seat.

Similar reference numerals refer to like parts in each of the several views.

The supporting structure on which the seat is movably supported and guided includes a lower horizontal part 10, and a back part 11 which rises from the rear end of the lower horizontal part 10. This supporting structure may be made in any suitable manner, but is preferably composed of angle bars, and the bars of each part are preferably made integral, the bars of the back part forming continuations of the bars of the lower horizontal part. This supporting structure is adapted to be applied directly to the body of the automobile in place of the usual pads or cushions and if desirable may be fastened or secured thereto in any suitable manner so as not to move or shift while the truck is being driven.

The seat frame is similarly composed of angle bars and consists of a seat part 12 and a back 13 which rises from the rear end of the seat part 12 and supports the back of the driver. The seat part 12 is preferably provided with a pad 14 and the back 13 with a pad 15 each of which pads are preferably secured to plates 16 which are in turn riveted to the seat frame. Further to render the use of the seat more comfortable the seat frame is preferably set at an angle so that the driver is seated in a slightly reclining and comfortable position.

Means are provided for guiding the seat frame in its movement to and from the supporting structure, which means are so organized as to compel the seat to move downwardly and slightly rearwardly and vice versa without substantial alteration of the angularity of the seat. These means are constructed as follows:

Arranged on each side of the seat frame is an L-shaped link 17 the shorter arm 18 of which projects upwardly and is pivotally secured to a cross rod 19 mounted in the back part 11 of the supporting structure, and the long arm 20 of which projects forwardly and is pivotally secured to a cross rod 21 mounted in the front end of the seat part 12 of the seat frame. By this means it is apparent that as the seat is depressed by one sitting upon it, or by a shock or jar of the car, the front part of the seat part 12 of the seat frame will be guided downwardly and rearwardly and by reason of the L-shape of the link 17, the link will at all times remain below the level of the seat and will nest alongside of the supporting structure when the seat frame is depressed its maximum extent.

To similarly guide the upper end of the back 13 of the seat frame, a pair of racks 22 are riveted or otherwise suitably secured to the back part 11 of the supporting structure and project upwardly and forwardly therefrom at the angle or inclination which it is desired to have the upper end of the seat frame follow. The teeth of each of these racks is engaged by a pinion 23 which pinions are fixed to the opposite ends of a cross rod 24 so as to turn therewith and the ends of this cross rod are secured to a pair of brackets 25 which are bolted or otherwise suitably secured to the sides of the back 13 of the seat frame. By mounting the pinions 23 on the rod 24 so as to turn together, the seat frame is prevented from cocking in its movement along the rack. To maintain the engagement between the pinions 23 and the racks 22, rollers 26 are mounted on the brackets 25 and engage the rear or untoothed sides of the racks as best shown in Figs. 2 and 3. Each of these rollers are preferably grooved so as to prevent lateral as well as forward movement of the seat frame relative to the supporting structure.

Since both the upper rack guide and the lower link guide permit only a downward and rearward movement of the seat frame, it follows that the seat frame necessarily assumes the various dotted line positions shown in Fig. 1, thereby avoiding a lurching or tipping of the seat frame in its movement and insuring a smooth and comfortable movement of the seat. To limit the upward movement of the seat frame, a pair of chains 27 connect the opposite sides of the seat frame with the supporting structure.

The air absorber by which the downward movement of the seat frame is cushioned when the truck body receives a shock or jar is constructed as follows:

The numeral 30 represents a cylinder which has a head 31 at its upper end, on which head is integrally formed an apertured ear 32. This ear receives a bolt 33 which is suitably secured at its other end to the rear side of the back 13 of the seat frame so that the seat frame and cylinder are compelled to move together as best shown in Fig. 1. Sufficient play is allowed between the ear 32 and the bolt 33 so as to permit a limited pivotal movement of these parts when the seat is moved vertically and laterally.

The lower end of this cylinder 30 is closed by a removable head 34 which is provided with a longitudinal slideway 35 in which is arranged a piston rod 36. At its lower end this piston rod 36 is pivotally connected with a yoke 37 which is suitably secured to an adjacent part of the supporting structure, sufficient play being allowed between the piston rod and the yoke to permit a limited pivotal movement as in the connection between the cylinder and the seat frame.

Within the cylinder the piston rod 36 is formed to provide a reduced portion 38 on which is fitted a piston 39 which is held against a fiber washer 40, this washer being fitted around the lower part of the reduced portion 38. This fiber washer prevents the leakage of air pressure and oil between the piston and the piston rod. On the upper side of the piston is arranged a cup washer 41 of leather or the like the flanges or edges of which extend upwardly along the cylinder wall and thereby prevent the leakage of air pressure or oil from the upper end of the cylinder past the piston to the lower end thereof. The upper end of the reduced portion 38 of the piston rod is externally threaded and a nut 42 holds the cup washer 41 against the piston and the piston against the fiber washer 40, a suitable washer 43 being interposed between the nut 42 and the cup washer 41. To spread the flanges or edges of the cup washer 41 and thereby insure the proper engagement thereof with the walls of the cylinder, a split spring ring 44 is arranged within the cup washer and bears outwardly. At its upper side this split ring 44 is provided with a plurality of inwardly extending lugs 45 which are engaged by a washer 46. This washer is held against these lugs by a lock nut 47 above the nut 42. To properly lubricate the piston and prevent the leakage of oil, a bath of oil 48 is retained above the piston and to insure proper lubrication of the cup washer, the upper retaining washer 45 is perforated.

Compressed air may be introduced into the upper end of the cylinder 30 through a threaded nipple 49 in which is arranged a check valve which permits air to be forced into the cylinder but prevents its escape. Air may be introduced in the usual manner by screwing the nozzle of an air line or pump to the nipple.

When there is a number of seats in the vehicle, such, for example, as in a passenger bus, in which separate absorbers are employed for each seat, provision is made for attaching the absorbers to an air line (not shown) which may be connected with a suitable reservoir and air pump. For this purpose the piston rod is provided with a threaded nipple 50 at its lower end and a conduit 51 extends through this nipple and the piston rod and opens into the cylinder above the piston. A check valve 52 is placed in this conduit. By this means the nipple 50 is arranged at the point of minimum movement of the absorber, and consequently a very short flexible connection can be employed. The upper end of the piston rod is extended upwardly a sufficient distance so that its opening is always above the bath of oil 48 on the upper side of the piston.

It is apparent that when the truck is thrown upwardly the relative downward movement of the seat frame weighted by the occupant will be cushioned by the compression of the body of air on the upper side of the piston within the cylinder, and the reverse movement of the truck body will withdraw the piston to its normal position. By this means the occupant or driver of the truck is cushioned against the shocks and jars of the vehicle as well as the minor vibrations thereby rendering the use of the same comfortable and healthful.

The cylinder is preferably maintained at a pressure of about forty pounds to the square inch, and is preferably so proportioned that a person weighing one hundred pounds will depress the piston about one-half inch. The movement of the piston is, of course, stopped when the weight of the occupant is exactly counterbalanced by the pressure in the cylinder. It is also obvious that a pair of absorbers can be employed in connection with one seat when the width of the seat and the number of occupants which it is designed to accommodate makes it desirable so to do.

If desired the seat may be upholstered in the usual manner by securing the upholstering material to the edges of the seat and the edge of the lower part of the supporting structure thereby enclosing the space below the seat frame and rendering it more finished in appearance.

As a whole this invention is very compact and simple in construction and reliable in operation, it operates to absorb and cushion the shocks, jars and vibrations of the truck and renders the riding of the same comfortable and healthful, it requires but little attention to keep in good working condition, and will not get out of order under severe use.

I claim as my invention:

1. A seat comprising a support, a seat frame, cushioning means between said support and frame, means connecting said support with one part of said seat frame to provide a direct downward and rearward movement of that part of said seat frame and means connecting said support with another part of said seat frame comprising a pair of links pivotally connecting said frame and support and guiding the corresponding part of said frame in its downward movement, each of said links being connected at its rear end to the rear part of said support and at its front end to the front part of said frame, the pivotal connections between said links and said seat frame being arranged below the plane of the pivotal connections between said links and said support to provide a direct downward and rearward movement similar to the direct downward and rearward movement of the first mentioned part of said seat frame whereby said seat frame moves from its normal elevated position without substantial alteration in its angularity.

2. A seat including a supporting structure composed of a lower horizontal part and a vertical back rising from said horizontal part, a seat frame composed of a horizontal seat part and a back rising from said seat part, cushioning means between said seat frame and said supporting structure, and means for guiding the movement of said seat frame relative to said supporting structure including a pair of L-shaped guide links, one arm of each of which projects upwardly and is pivotally secured to said back part of said supporting structure and the other arm of which projects forwardly and is pivotally secured to the front end of the horizontal seat part of said seat frame.

3. A seat including a support, a seat frame, cushioning means between said support and said seat frame, means connecting said support with one part of said seat frame to provide a direct downward and rearward movement of that part of said seat frame and means connecting said support with another part of said seat frame, comprising inclined rack and pinion guiding means between said support and said seat frame, said rack and pinion means providing a direct downward and rearward movement of the corresponding part of said seat frame similar to the downward and rearward movement of the first mentioned part of said seat frame whereby said seat frame moves from its normal elevated position directly downwardly and rearwardly without substantial alteration in its angularity.

4. A seat including a supporting structure composed of a lower horizontal part and a vertical back rising from said horizontal part, a seat frame composed of a seat part and a back part rising from said seat part, a pair of racks mounted on the back part of said supporting structure and a pair of pinions mounted on the back part of said seat frame and each meshing with one of said racks thereby to form a guiding connection between said seat frame and supporting structure.

5. A seat including a supporting structure composed of a lower horizontal part and a vertical back rising from said horizontal part, a seat frame composed of a seat part and a back part rising from said seat part, a pair of forwardly and upwardly inclined racks mounted on the back part of said supporting structure adjacent the upper end thereof, a pair of pinions mounted on the back part of said seat frame and each meshing with one of said racks, and a pair of rollers mounted on the back part of said seat frame and each engaging the side of each rack opposite to its toothed side, said racks, pinions and rollers forming a guiding connection between said supporting structure and said seat frame whereby said seat frame is moved rearwardly upon being depressed.

6. A seat including a supporting structure composed of a lower horizontal part and a vertical back part rising from said horizontal part, a seat frame composed of a seat part and a back part rising from the rear end of said seat part, cushioning means between said supporting structure and said seat frame, a guiding connection between the upper ends of the back parts of said supporting structure and said seat frame, and a guiding connection between the seat part of said seat frame and said supporting structure, said guiding connections being adapted to guide said seat frame to provide a direct downward and rearward movement of said seat frame from its normal elevated position and vice versa without substantial alteration in the angularity of the seat frame.

7. A seat including a supporting structure composed of a lower horizontal part and a vertical back part rising from said horizontal part, a seat frame composed of a seat part and a vertical back part rising from the rear end of said seat part, cushioning means between said supporting structure and said seat frame, a forwardly and upwardly inclined rack mounted on the upper part of the back part of said supporting structure, a pinion mounted on the back part of said seat frame and engaging the teeth of said rack, a guide roller mounted on said seat frame and engaging said rack, and an L-shaped lever one arm of which projects upwardly and is pivotally secured to the back part of said supporting structure and the other arm of which projects forwardly and is pivotally secured to the front end of the seat part of said seat frame, said connecting elements between said seat frame and supporting structure permitting a downward and rearward movement of said seat frame and vice versa.

8. A seat including a supporting structure, a seat frame comprising a seat part and a back part rising from said seat part, means for guiding said seat frame for downward and rearward movement relative to said supporting structure, and means for cushioning the downward movement of said seat frame and returning said seat frame to its normal elevated position, comprising an air spring composed of a vertical cylinder arranged in rear of the back part of said seat frame, a piston in said cylinder and reacting against a confined body of compressed air therein, a piston rod connected to said piston and means operatively connecting said air spring with the back part of said seat frame with supporting structure whereby the downward movement of said seat frame is resisted by said confined body of compressed air and said seat frame is returned to its normal elevated position by said confined body of compressed air.

ALBERT F. HICKMAN.